Feb. 6, 1962    W. F. GUENTHER    3,020,467
BINARY ALTERNATOR
Filed Nov. 14, 1957
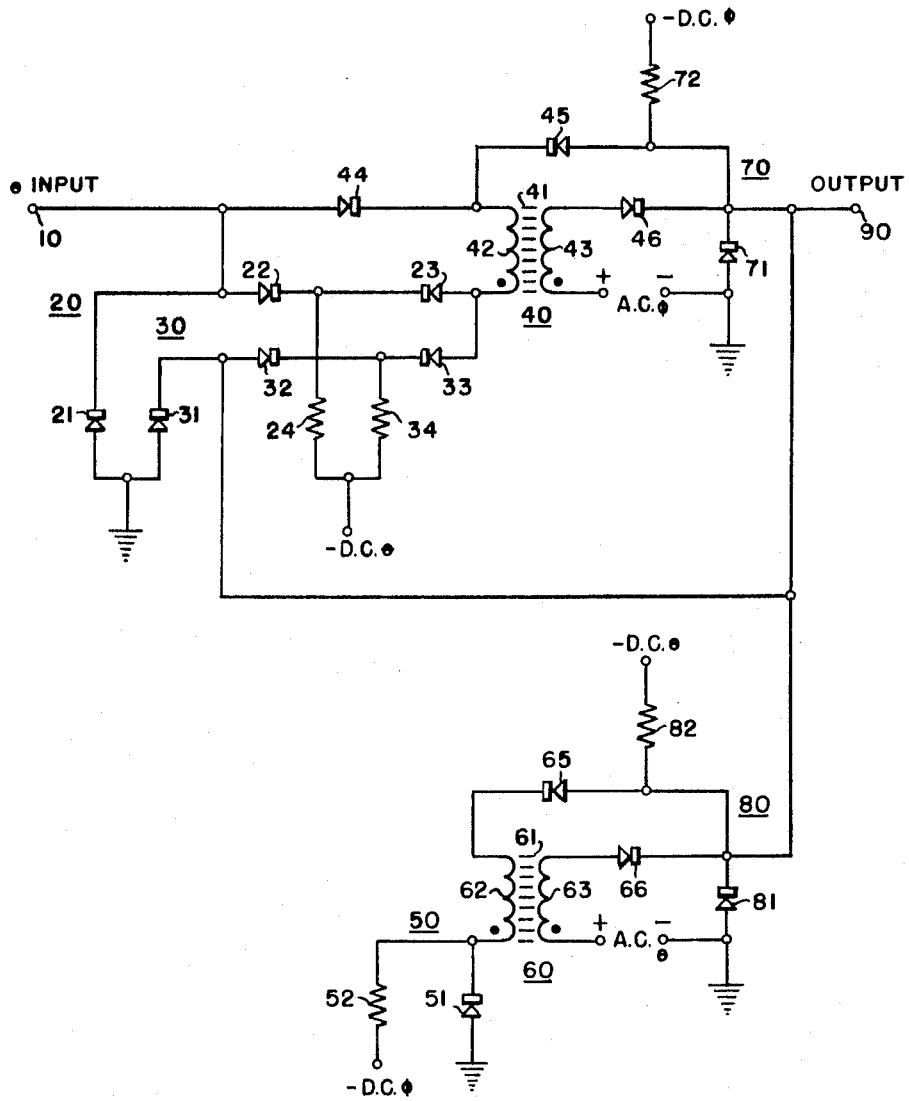
WITNESSES
John E. Healy, Jr.
Myron E. Click
INVENTOR
Walter F. Guenther
BY
F. E. Browder
ATTORNEY

# United States Patent Office 3,020,467
Patented Feb. 6, 1962

3,020,467
BINARY ALTERNATOR
Walter F. Guenther, Penn Township, Allegheny County, Pa., assignor to Westinghouse Electric Corporation, East Pittsburgh, Pa., a corporation of Pennsylvania
Filed Nov. 14, 1957, Ser. No. 696,437
8 Claims. (Cl. 323—89)

This invention relates to binary alternators in general and in particular to binary alternators utilizing magnetic amplifiers.

It is an object of this invention to provide an improved binary alternator.

It is another object of this invention to provide an improved binary alternator which will alternate between one output state and another output state upon the reception of successive single pulse input signals of the same phase.

Further objects of this invention will become apparent from the following description as taken in conjunction with the accompanying drawing. In said drawing, for illustrative purposes only, is shown a preferred form of the invention.

In the drawing there is illustrated a schematic diagram of an improved binary alternator circuit embodying the teachings of this invention. In the drawing the manner in which the windings have been wound on the magnetic core members has been denoted by the polarity dot convention. The polarity dot convention denotes direction of saturation. That is current flowing into the polarity dot end of a winding will drive the associated core toward positive saturation. Current flowing out of a polarity dot end of a winding will drive the associated core away from positive saturation.

Referring to the drawing, the binary alternator illustrated therein comprises, in general, terminal means 10 for applying an input signal, a magnetic amplifier 40, a magnetic amplifier 60 and terminal means 90 for driving an output from the alternator.

The magnetic amplifier 40 comprises a saturable magnetic core member 41 having inductively disposed thereon a reset winding 42 and a gating winding 43. The input terminal 10 is connected through a rectifier 44 to a first lead of the reset winding 42. The input terminal 10 is also connected through a rectifier 22 of a nonlinear circuit 20 and a rectifier 23 to the second lead of the reset winding 42. The second lead of the reset winding 42 is connected through the rectifiers 23, 22 and 21 to ground. The second lead of the reset winding 42 is also connected through a rectifier 33, a rectifier 32 and a rectifier 31 to ground. The junctions of the rectifiers 23, 22 and the rectifiers 33, 32 are connected to a negative half-way, direct-current source, the phase of which will be designated as $\theta$. The gating winding 43 of the magnetic amplifier 40 is connected in series circuit relationship between a source of alternating current, the phase of which will be designated as $\phi$, and a rectifier 46, a rectifier 71 and ground. A non-linear circuit 70 comprising the rectifier 71 and a current limiting resistor 72 is connected between ground and a negative half-wave, direct current of the $\phi$ phase. All voltage sources described herein are to be of the same frequency with the $\phi$ phase being 180° out-of-phase with the $\theta$ phase.

The magnetic amplifier 60 comprises a saturable magnetic core member 61 having inductively disposed thereon a reset winding 62 and a gating winding 63. One lead of the reset winding 62 is connected to ground through a rectifier 51. A non-linear circuit 50 comprising the rectifier 51 and a current limiting resistor 52 is connected between ground and a source of negative half-wave, direct current of the $\phi$ phase. The gate winding 63 is connected in series circuit relationship between a source of alternating current of the $\theta$ phase and rectifier 66, a rectifier 81 and ground. A non-linear circuit 80 comprising the rectifier 81 and a current limiting resistor 82 is connected within ground and a source of negative half-wave, direct current of the $\theta$ phase. The outputs of the magnetic amplifiers 40 and 60 are obtained through the rectifiers 46 and 66, respectively. The output of the magnetic amplifier 40 is connected to the first lead of the reset winding 62 of the magnetic amplifier 60 through a rectifier 65. The output of the magnetic amplifier 60 is connected to the first lead of the reset winding 42 of the magnetic amplifier 40 through a rectifier 45. The output of the magnetic amplifier 60 is also connected to the junction of the rectifier 31 and 32 of the non-linear circuit 30. Both outputs may be connected to a common output terminal 90 as illustrated in FIG. 1.

The magnitude of the alternating current sources hereinbefore described is sufficient to drive the magnetic core members 41 and 61 to positive and negative saturation by their applications to the gating windings 43, 63, and the reset windings 42 and 62, respectively. The non-linear circuits described hereinbefore are well-known to those skilled in the art and are so disposed in relationship to the above circuit that they permit the flow of a predetermined magnetizing current to the windings on the core members during chosen half-cycles of biasing without any voltage drop while also providing protection for the circuits and apparatus from excessive current flow.

The operation of the apparatus illustrated in the drawing will now be described. The magnetic amplifiers 40 and 60 utilized in this invention operate in accordance with the discussion above as per the magnetic core members 41 and 61 respectively being driven to either positive or negative saturation depending upon whether a current is delivered to the associated gating or reset windings. Therefore, if a core has been driven to negative saturation by an input or feedback current through its associated reset winding, the current supplied to the gating winding associated with that core will be fully utilized in driving the core member back to positive saturation and there will be no output from that gating winding during that half-cycle of applied voltage.

The magnetic amplifiers 40 and 60 may be operated as complementary amplifiers. That is, if the amplifiers 40 and 60 were operated individually they would gate an output at all times except when receiving an input signal of the proper phase and magnitude through their reset windings.

Assume that the magnetic core member 41 is gating an output from the gating winding 43 through the rectifier 46, this output will be a pulse of direct-current of the $\phi$ phase. A portion of this output is fed to the reset winding 62 of the magnetic amplifier 60 through the rectifier 65, resetting the flux density of the magnetic core member 61 to negative saturation. The negative direct-current source supplying or biasing the non-linear circuit 50 is of the $\phi$ phase and permits the flow of current in winding 62 for the resetting of core 61.

On the second half-cycle of operation a half-wave pulse, of the $\theta$ phase, may be applied to the input terminal 10. Two current paths have been provided for resetting the magnetic core member 41. A first path is through the rectifier 44 and the non-linear circuit 20. The second path is through the rectifier 44 and the non-linear circuit 30. When an input pulse of the $\theta$ phase is applied and the proper magnitude to the input terminal 10 it blocks resetting of the magnetic core member 41 through the non-linear circuit 20 at the rectifier 22. However, reset current for the magnetic core member 41 will flow through the rectifier 33 and the non-linear circuit 30 accomplishing resetting of the magnetic core member 41. During this second half-cycle of operation, the magnetic core member 61 of the magnetic amplifier 60 is being driven toward positive saturation by the positive half-wave of the θ phase, applied to the gating winding 63.

On the third half-cycle of operation, there is no output from the magnetic amplifier 40 since the magnetic amplifier 40 was just reset by the input signal at terminal 10 on the second half-cycle. Since there is no output from the magnetic amplifier 40, the magnetic amplifier 60 will not be reset by feedback current through rectifier 65 on this half-cycle.

On the fourth half-cycle of operation, the magnetic amplifier 60 will gate an output of the θ phase since the magnetic core member 61 was driven positive saturation on the second half-cycle of operation. A portion of the output from the magnetic amplifier 60 on this fourth half-cycle will be delivered through the rectifier 45 to the reset winding 42 of the magnetic amplifier 40. A portion of this output will block reset of the magnetic amplifier 40 through the non-linear circuit 30 in the rectifier 32 at the junction of the rectifiers 31 and 32. However, the single pulse input at the terminal 10 has disappeared and the magnetic amplifier 40 may be reset through the non-linear circuit 20. Thus, the output of the binary alternator illustrated in the drawing has been changed from the φ phase to the θ phase and will continue with the output of the magnetic amplifier 60 resetting the magnetic amplifier 40 through the rectifier 45 and the non-linear circuit 20.

When it is desired to change the output phase of the binary alternator back to the φ phase, a single pulse signal of the θ phase will be applied to the terminal 10. Since the output from the magnetic amplifier 60 was already blocking reset of the magnetic amplifier 40 through the non-linear circuit 30, the single pulse input signal at the terminal 10 will block reset of the magnetic amplifier 40 at the rectifier 22 of the non-linear circuit 20 and the magnetic amplifier 40 will receive no resetting action from the output of the magnetic amplifier 60 nor from the input at terminal 10. Therefore, on this first half-cycle of the application of the input signal there will be no resetting of the magnetic amplifier 40 and on the next succeeding half-cycle an output will be gated from the magnetic amplifier 40 which effects a reset of the magnetic amplifier 60. On the third half-cycle, the magnetic amplifier 60 will not gate an output since it has just been reset on the second half-cycle and the output of the binary alternator illustrated on the drawing has been changed back to that of the φ phase.

Many applications requiring the functions performed by the apparatus hereinbefore described will find the circuit particularly useful where a memory function is required or where a flip-flop circuit is required for counters, shift registers, simulators, etc.

In conclusion, it is to be pointed out that while the illustrated example constitutes a practical embodiment of my invention, I do not limit myself to the exact details shown, since modification of the same may be varied without departing from the spirit of this invention.

I claim as my invention:

1. In a binary alternator, in combination, first and second complementary magnetic amplifiers, means for applying an input signal to reset said first magnetic amplifier, means for connecting the output signal of said first magnetic amplifier to said second magnetic amplifier to effect a reset of said second magnetic amplifier, means for connecting the output signal of said second magnetic amplifier to said first magnetic amplifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present.

2. In a binary alternator, in combination, first and second complementary magnetic amplifiers each having reset and gating means, means for applying an input signal to reset said first magnetic amplifier, means for connecting the output signal of said first magnetic amplifier to said second magnetic amplifier to effect a reset of said second magnetic amplifier, means for connecting the output signal of said second magnetic amplifier to said first magnetic amplifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present.

3. In a binary alternator, in combination, first and second complementary magnetic amplifiers each having reset and gating means, means for applying an input signal to reset said first magnetic amplifier, means for connecting the output signal of said first magnetic amplifier to said second magnetic amplifier to effect a reset of said second magnetic amplifier, means for connecting the output signal of said second magnetic amplifier to said first magnetic amplifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present, said circuit means comprising first and second non-linear circuits connected to said reset means of said first magnetic amplifier.

4. In a binary alternator, in combination, first and second complementary magnetic amplifiers each having reset and gating means, means for applying an input signal to reset said first magnetic amplifier, means for connecting the output signal of said first magnetic amplifier to said second magnetic amplifier to effect a reset of said second magnetic amplifier, means for connecting the output signal of said second magnetic amplifier to said first magnetic amplifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present, said circuit means comprising first and second non-linear circuits connected to said reset means of said first magnetic amplifier, said first and second non-linear circuits each comprising current limiting means, a first rectifier and a second rectifier connected in series circuit relationship between a negative source of direct current and ground.

5. In a binary alternator, in combination, first and second complementary magnetic amplifiers each having reset and gating means, means for applying an input signal through an isolating rectifier to reset said first magnetic amplifier, means for connecting the output signal to said first magnetic amplifier to said second magnetic amplifier through an isolating rectifier to effect a reset of said second magnetic amplifier, means for connecting the output signal of said second magnetic amplifier to said first magnetic amplifier through an isolating rectifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present, said circuit means comprising first and second non-linear circuits connected to said reset means of said first magnetic amplifier, said first and second non-linear circiuts each comprising current limiting means and a first rectifier and a second rectifier connected in series circuit relationship between a negative source of direct current and ground.

6. In a binary alternator, in combination, first and second complementary magnetic amplifiers each having reset and gating means, means for applying an input signal through an isolating rectifier to reset said first magnetic amplifier, means for connecting the output signal of said first magnetic amplifier to said second magnetic amplifier through an isolating rectifier to effect a reset of said second magnetic amplifier, means for connecting the output signal of said second magnetic amplifier to said first magnetic amplifier through an isolating rectifier to effect a reset of said first magnetic amplifier, and circuit means connected to said reset means of said first magnetic amplifier for affording two current paths for resetting of said first magnetic amplifier, said circuit means being operative to prevent reset of said first magnetic amplifier when both said input signal and said output signal of said second magnetic amplifier are simultaneously present, said circuit means being operative to allow reset of said first magnetic amplifier when only one of said input and said second magnetic amplifier output signals is present, said circuit means comprising first and second non-linear circuits connected to said reset means of said first magnetic amplifier, said first and second non-linear circuits each comprising current limiting means and a first rectifier and a second rectifier connected in series circuit relationship between a negative source of direct current and ground, said output signal of said second magnetic amplifier being connected to the junction of said first and said second rectifiers of said second non-linear circuit, said input signal being connected to the junction of said first and said second rectifiers of said first non-linear circuit means.

7. In a binary alternator, in combination, first and second complementary magnetic amplifiers each having reset and gating winding means, means for applying an input signal to said reset winding means of said first magnetic amplifier, means for connecting the output signal from said gating winding means of said first magnetic amplifier to said reset winding means of said second magnetic amplifier, means for connecting the output signal from said gating winding means of said second magnetic amplifier to said reset winding means of said first magnetic amplifier, first and second non-linear circuits connected to said reset winding means of said first magnetic amplifier whereby two current paths are provided for resetting said first magnetic amplifier, said non-linear circuits each comprising a first rectifier and a second rectifier and current limiting means and means for applying a source of direct current connected in series circuit relationship, means for connecting said input signal to the junction of said first and second rectifiers of said first non-linear circuit, and means for connecting said output signal of said second magnetic amplifier to the junction of said first and second rectifiers of said second non-linear circuit.

8. In a binary alternator, in combination, first and second complementary magnetic amplifiers each having reset and gating winding means, means for applying an input signal through isolating rectifier means to said reset winding means of said first magnetic amplifier, means for connecting the output signal from said gating winding means of said first magnetic amplifier through isolating rectifier means to said reset winding means of said second magnetic amplifier, means for connecting the output signal from said gating winding means of said second magnetic amplifier through isolating rectifier means to said reset winding means of said first magnetic amplifier, first and second non-linear circuits connected to said reset winding means of said first magnetic amplifier whereby two current paths are provided for resetting said first magnetic amplifier, said non-linear circuits each comprising a first rectifier and a second rectifier and current limiting means and means for applying a source of direct current connected in series circuit relationship, means for connecting said input signal to the junction of said first and second rectifiers of said first non-linear circuit, and means for connecting said output signal of said second magnetic amplifier to the junction of said first and second rectifiers of said second non-linear circuit.

References Cited in the file of this patent

UNITED STATES PATENTS

| | | |
|---|---|---|
| 2,760,086 | Van Nice | Aug. 21, 1956 |
| 2,914,753 | Goodell et al. | Nov. 24, 1959 |